United States Patent Office

3,300,421
Patented Jan. 24, 1967

3,300,421
RESILIENT CELLULAR MATERIAL AND METHOD FOR MAKING SAME
Peter Merriman, Birmingham, Donald James Simcox, Sutton Coldfield, and John Leathem Matthew Newnham, Clifton, York, England, assignors to Dunlop Rubber Company Limited, London, England, a British company
No Drawing. Filed Dec. 21, 1962, Ser. No. 246,322
Claims priority, application Great Britain, Jan. 11, 1962, 1,016/62
6 Claims. (Cl. 260—2.5)

This invention relates to resilient cellular materials, including resilient cellular materials suitable for use in upholstered structures and as packing materials. The resilient cellular materials with which the invention is concerned are derived from fluid precursors, and they include latex foam rubber and resilient polyurethane foams, and also materials obtained by bonding together (or "reconstituting") fragments of resilient cellular materials. Latex foam rubber is commonly obtained from a suitably compounded aqueous natural and/or synthetic rubber dispersion by foaming, gelling and vulcanising. Resilient polyurethane foams are commonly obtained from a liquid or low-melting organic chain compound with at least two isocyanate-reactive groupings (e.g. OH radicals) in its molecule and a liquid or low-melting organic compound with at least two —NCX groups in its molecule, where X represents an oxygen atom or a sulphur atom. Various types of compound may be used as the organic chain compound, including polyesters, polyesteramides, polyether polyols, and glycerides of hydroxyacids (e.g. those found in castor oil). The polyurethane foam may be obtained from the two principal starting materials just mentioned together with the auxiliary ingredients familiar to those skilled in the art (including catalysts, activators, cross-linking ingredients, foam-stabilising agents, auxiliary inflating agents, fibrous fillers, ground scrap resilient cellular material, flame retardants, antioxidants, and colouring agents) either by a single-stage process or by way of a "prepolymer," i.e. an intermediate reaction product of the two principal starting materials which is still liquid or low-melting and which has —NCX groups still available for reaction.

According to the present invention, a resilient cellular material derived from a fluid precursor is made by a method which includes the step of incorporating in the fluid precursor bodies of a substantially rigid expanded glass or synthetic resin composition.

Also, according to a particular aspect of the present invention, a composite resilient cellular material is made by a method which comprises bonding together fragments of resilient cellular material with which are mixed bodies of an expanded polystyrene composition and/or other substantially rigid cellular material.

The invention also includes, as a novel material, composite resilient cellular material comprising fragments of resilient cellular material and bodes of an expanded polystyrene composition and/or other substantially rigid cellular material, bonded together. Materials of this type are referred to generally in the description given below as "bonded resilient fragment" materials.

The bodies of a substantially rigid expanded glass or synthetic resin composition referred to above include in particular the substantially unicellular expanded bodies known as "Microballons," i.e. hollow substantially spherical bodies of a glass or synthetic resin composition; the Microballons have diameters in typical cases within the range 2 to 100 microns, i.e. 0.002 to 0.100 mm. Various grades of glass and synthetic resin composition Microballons are available commercially. Generally, if the material is not of the bonded resilient fragment type, the weight of the expanded bodies may suitably be ¼% to 30% and preferably 2% to 10% of the weight of the resilient cellular material proper, and/or their bulk volume may suitably be 0.01% to 25% and preferably 0.08% to 10% of that of the resilient cellular material proper. The expanded bodies may if desired be given a preliminary treatment with (e.g.) a solvent, a detergent, or a catalyst for the conversion of the fluid precursor into the resilient cellular material, with a view to increasing the adhesion of the expanded bodies to the resilient cellular material itself. Some examples of catalysts for the conversion of the fluid precursor into the resilient cellular material which may be used in the case of resilient polyurethane foams are tertiary amines and ferric acetylacetonate.

The expanded synthetic resin composition bodies which may be used include in particular bodies composed of a thermo-set synthetic resin composition, e.g. a urea-formaldehyde resin composition or a phenol-formaldehyde resin composition, which may be nitrogen-filled. The two resins just mentioned are believed to be capable of chemically interacting to some degree with the iso(thio)cyanate consituents of the resilient polyurethane foam forming mixtures, though it is to be understood that the invention is in no way dependent upon such an effect. However, it is also possible to use expanded synthetic resin composition bodies composed of a thermoplastic synthetic resin composition, e.g. the bodies of an expanded polystyrene composition already referred to in connection with the bonded resilient fragment materials.

When bodies of an expanded polystyrene composition are used, they may suitably be derived from bodies of a thermally-expandable polystyrene composition containing, in addition to the polystyrene itself, a volatile liquid such as a mixture of pentanes, for example. Such expandable bodies may be expanded by heating to a temperature of the order of 100° C. Generally it is convenient to use expanded polystyrene composition bodies with diameters of 0.1 mm. to 10 mm. or more. Some specific examples of other bodies of substantially rigid cellular materials which may be used in the bonded resilient fragment materials are fragments obtained by cutting up or grinding up cellular phenol-formaldehyde resin compositions, rigid cellular polyurethane compositions, cellular ebonite compositions, and cellular polystyrene compositions (in massive form rather than the form just described). Whatever the chemical constitution of the bodies of the substantially rigid cellular material may be, they may be of any of a wide variety of shapes, and may thus be of an elongated shape or even of a fibrillar form.

When a bonded resilient fragment material is to be made in accordance with the present invention, the fragments of resilient cellular material used may suitably comprise fragments of resilient polyurethane foam, but may also comprise fragments of latex foam rubber, expanded rubber, or a resilient expanded vinyl resin composition, for example. Further, mixtures of two or more resilient cellular materials in fragmentary form may be used. Generally it is convenient to use fragments with diameters of 0.1 mm. to 40 mm. In addition to the resilient cellular material fragments and the bodies of an expanded polystyrene composition and/or other substantially rigid cellular material, the material bonded together in the production of a bonded resilient fragment material in accordance with the present invention may if desired include fibrous and/or other non-cellular constituents. For instance, there may be included reclaimed rayon fibre derived from tyre reclaiming and still having particles of vulcanised rubber composition associated with it. The proportion by weight of the bodies of an expanded polystyrene composition and/or other substantially rigid cellular material to the resilient cellular material fragments is preferably within the range 1% to 30%, proportions of 3% to 8% being in general particularly useful. The proportion by weight of any reclaimed rayon fibre or other fibrous constituent to the resilient cellular material fragments may suitably be within the range 1% to 30%.

Generally, the expanded glass or synthetic resin composition bodies may be incorporated in the fluid precursor of the resilient cellular material in question at any convenient stage, and may thus be incorporated in either a foamed or an unfoamed precursor, though it will be understood that insofar as distribution is to be uniform the bodies should be thoroughly dispersed. In the more specific case in which resilient cellular material fragments and bodies of an expanded polystyrene composition and/or other substantially rigid cellular material, with or without additional constituents such as fibres, are to be bonded together, it is preferred that a liquid polyurethane-forming composition should be used as a bonding agent, i.e. a liquid composition derived (basically) from one or more organic compounds having at least two —NCO or —NCS radicals in the molecule (e.g. a tolylene diisocyanate) and one or more organic chain compounds having at least two active-hydrogen-containing groups in the molecule (e.g. a polyether diol, triol, or tetrol, or polyester or polyesteramide). The liquid polyurethane-forming composition may be so formulated that it will foam, i.e. will give a solidified bonding material which is itself cellular. Also the liquid polyurethane-forming composition may be of a kind which affords a "prepolymer," i.e. an intermediate reaction product of the organic iso-(thio)cyanate and the organic chain compound in which —NCO or —NCS radicals are still available for reaction, rather than of a kind with which the bonding is effected by means of a single-stage polyurethane-forming reaction. Further guidance as to the formulation and application of liquid polyurethane-forming compositions for the purpose of making bonded resilient fragment materials in accordance with the present invention is to be found in the examples set out below and in British Patents 869,624, and 898,272. Other liquid bonding agents may be used in making the bonded resilient fragment materials besides the liquid polyurethane-forming compositions, it being understood that on setting they need to give a solidified bonding material which is flexible; some examples of alternative bonding agents are compositions based on liquid organic polysulphides together with epoxy resins, and rubber latices compounded to give spontaneous gelation. Generally the proportion by weight of the liquid bonding agent to the material to be bonded by it should preferably be within the range 1:2 to 1:12 respectively.

When bonded resilient fragment materials are being made in accordance with the present invention, it is preferred that the material to be bonded should be placed under compression, e.g. to a volume 95% to 50% of its uncompressed volume, after it has been mixed with the liquid bonding agent and until it has been reasonably securely bonded. Thus in the case of bodies of the composite resilient cellular material which are to be produced in a mould with parallel walls, a charge of material within the mould may conveniently be compressed by means of an internally-fitting lid, suitably loaded.

A particular advantage of incorporating the expanded bodies in a resilient cellular material in accordance with the present invention is that a very useful improvement (for upholstery and shock-absorbing applications, at least) can be secured in the load-compression (load-indentation) characteristics of a given material; more particularly the load-carrying capacity (hardness) of the material at a given compression (indentation) can be increased, and/or the linearity of the load-compression (load-indentation) graph can be improved. (In the latter case the practical result can be a gain in comfort in the case of upholstery applications, or an increase in the peak deceleration in the case of shock-absorbing applications.) In connection with these beneficial effects we have found the use of Microballons of the lower commercially-available densities particularly beneficial. If a very high load-carrying capacity is not desired, the application of the present invention can still be of considerable advantage in that the resilient cellular material proper can be of reduced density but can still have a given load-carrying capacity at a reduced materials cost as a result of the incorporation of the expanded composition bodies.

In a bonded resilient fragment material derived by bonding together crumbed resilient polyurethane foam, it is possible, by incorporating in accordance with the present invention 5% by weight of expanded polystyrene composition granules (referred to the polyurethane crumb), to secure increases in the load-carrying capacity of 50 to 100%, depending on the degree of compression at which the load-carrying capacities are compared. Nevertheless, since expandable polystyrene compositions are relatively inexpensive, the advantage gained by the incorporation of a relatively small proportion of expanded polystyrene composition bodies in a bonded resilient fragment material in accordance with the present invention will generally very greatly outweigh the additional cost of the polystyrene constituent.

The following examples illustrate the invention. All the parts given in the examples are parts by weight. Examples 7, 8 and 9 illustrate the production of bonded resilient fragment materials.

*Example 1*

Four parts of urea-formaldehyde resin Microballons of intrinsic density 0.17 gram/cc. were stirred into 100 parts of a 3000 molecular weight glycerol-centred polypropylene glycol triol (sold under the trade name Niax Triol LG–56). Using a high-speed stirrer a uniform suspension was obtained in 3 minutes. A resilient polyurethane foam was then prepared by a single-stage method by successively adding to this suspension 1 part of "L–520" water-soluble silicone of Union Carbide Ltd., 3.26 parts of water, 0.6 part of a solution of 1 part of diazabicyclooctane (triethylene diamine) in 5 parts of water, 0.4 part of stannous octoate, and 0.22 part of N-methyl-morpholine, and then stirring the whole at high speed for 7–8 seconds. 44 parts of a mixture of 80 parts of 2:4-tolylene diisocyanate and 20 parts of 2:6-tolylene diisocyanate were then stirred in for a further 7–8 seconds and the mixture poured into a paper-bag mould where it foamed up and gelled in the normal manner. The product was a resilient, open-pored foam having a density of 0.030 gram/cc.

A control foam was made in exactly the same way except that the Microballons were omitted. This had a density of 0.031.

The load-indentation curves of the two foams were plotted and it was found that the foam containing the Microballons was 1.44 times harder (i.e. supported a load 1.44 times greater) than the control at 40% indentation of its initial thickness, and that at higher indentations it was relatively harder still. These hardness data point to the conclusion that at a given density the presence of the cellular filler improves the load-carrying capacity and reduces "bottoming." A comparison of costs showed that the materials cost per unit of hardness was only about three-quarters of that of the control.

*Example 2*

The procedure of Example 1 was repeated except that in place of the 4 parts of urea-formaldehyde Microballons, there were used 15 parts of nitrogen-filled phenol-formaldehyde resin Microballons of intrinsic density 0.34 gram/cc. A further difference, moreover, was that in view of this larger quantity of a denser cellular filler the net water content and tolylene diisocyanate content were each increased by 10% as compared with the control, viz. to 4.14 parts and 48.4 parts respectively. This ensured that the finished foam density was similar to that of the control, viz. 0.029 gram/cc.

The 40% indentation hardness was 1.39 times that of the 0.031 density control, and there was again a "bulking" effect at higher indentations which reduced bottoming. Moreover in this case the load-indentation curve was more nearly linear than that of the control, implying a gain in comfort characteristics in upholstery applications. The materials cost per unit of hardness was only about 0.77 times that of the control.

*Example 3*

A polyurethane prepolymer was made by mixing 100 parts of the polyether triol of Example 1 (of 0.089% water content) with 0.05 part of triethylene diamine and 9.6 parts of the tolylene diisocyanate. The mixture was stirred and in half-an-hour the temperature had risen to 52° C. and then remained steady. At the end of 2 hours a further 20.9 parts of tolylene diisocyanate were added and stirring continued for a further 1 hour. The batch was then left to cool. The next day the isocyanate group content was measured and adjusted to 10% by the addition of a further 5.36 parts of tolylene diisocyanate.

100 parts of this prepolymer were stirred at high speed with 2.9 parts of the urea-formaldehyde Microballons of Example 1 and then with a further 1.2 parts of tolylene diisocyanate.

To prepare the foam this mixture was stirred at high speed for about 11 seconds with the following ingredients added quickly in succession: 0.5 part of 50 centistoke grade MS-200 polydimethylsiloxane oil of Midland Silicones Ltd., 0.4 part of triethylamine, 1 part of N-methylmorpholine and 3.12 parts of water. The mixture was poured into a paper-bag mould and foamed up and set in the usual manner to a resilient foam. After mangling the foam, to break closed pores, it had a density of 0.032 gram/cc.

A control foam was made in exactly the same way but omitting the Microballons. This had a density of 0.033.

The 40% indentation hardness was 1.2 times greater than that of the control and there was the usual advantage in reduced bottoming at high indentations. The load-indentation curve was a little smoother, making for slightly increased comfort.

*Example 4*

The procedure of Example 3 was repeated except that 8 parts of the phenol-formaldehyde Microballons of Example 2 were used in place of the urea-formaldehyde Microballons. This time the foam density was 0.032 and there was no appreciable difference in hardness as compared with the control. However, there was a much more linear load-indentation curve, even up to 60% indentation, indicating a considerable gain in comfort.

*Example 5*

A blend of centrifuged concentrated natural rubber latex and 70:30 butadiene:styrene high-solids freeze-agglomerated synthetic rubber latex was compounded to contain the following ingredients:

|  | Parts |
|---|---|
| Polymer from natural rubber latex | 50 |
| Potassium oleate soap | 0.1 |
| Polymer from synthetic rubber latex | 50 |
| Sulphur | 2.0 |
| N-N'-di-beta-naphthyl-p-phenylene diamine | 0.35 |
| Zinc mercaptobenzthiazole | 1.5 |
| Zinc diethyldithiocarbamate | 0.5 |

To this compounded mixture was added 10 parts by weight of cellular urea-formaldehyde resin Microballons of intrinsic density 0.17 gram/cc. The resulting compounded mixture was foamed using a planetary mixing machine, and during foaming there was added 0.4 part of potassium oleate soap, 3.0 parts zinc oxide, 0.1 part lauryl pyridinium chloride and 2.0 parts sodium silicofluoride. The resulting foam which had a good and acceptable appearance, was poured into a mould to set and then vulcanised in steam at 100° C. for 30 minutes. The product was stripped from the mould, washed and dried and its density and compression hardness at 40% compression measured. The product had a good and acceptable structure and a density of 0.1150 g./cm.³. Its compression hardness was 150 g./cm.² at 40% compression.

A control product was made without the addition of Microballons but in the same manner otherwise, except that the second addition of potassium oleate soap was 0.15 part instead of 0.4 part. The density of this control product was 0.1155 g./cm.³ and its compression hardness was 75 g./cm.² at 40% compression. The product containing the 10 parts of cellular urea-formaldehyde resin Microballons therefore showed an increase in hardness of 100% at substantially the same product-density.

*Example 6*

A product was prepared according to the method described for the control product in Example 5 except that before foaming there were added 10 parts of cellular phenol-formaldehyde resin Microballons of intrinsic density 0.34 gm./cc. After vulcanising, washing, and drying, the product, which was of good and acceptable structure, had a density of 0.1150 g./cm.³ and a compression hardness of 96½ g./cm.² at 40% compression. This hardness was an increase of 28% compared with the control product made at the same density.

*Example 7*

A liquid bonding agent was prepared by stirring for 2 hours 100 parts of a polyether tetrol derived from ethylene diamine by reaction first with propylene oxide and subsequently with ethylene oxide so that the four polyoxypropylene chains were "tipped" with oxyethylene units (sold under the trade name "Tetronic 701") and 28 parts of an 80:20 mixture of 2,4- and 2,6-tolylene diisocyanate. At the end of the two hours the material had substantially regained room temperature after an exothermic reaction. 1.3 parts of stannous octoate catalyst were added with stirring for 2 minutes.

The fragments of resilient cellular material used were of crumbed scrap resilient polyurethane foam, and consisted of irregularly shaped pieces with diameters mostly within the range 3 to 30 mm. and densities mostly within the range 1½ to 3 lbs./cu. ft. Bodies of expanded polystyrene composition were used which were granules obtained by expanding inflatable polystyrene beads having approximate original diameters of 0.2 to 0.6 mm. by heating them for 15 minutes at 100° C., in steam at atmospheric pressure and subsequently drying them in air. The polyurethane crumb and polystyrene granules were mixed together in the proportions of 19 parts to 1 part respectively for 5 minutes and then mixed for 10 minutes with the liquid bonding agent in the proportion of 1 part of bonding agent to 5 parts of mixed crumb and granules.

The slightly tacky but loose material so obtained was charged into an open rectangular polyethylene mould and the charge was compressed to 60% of its original depth by means of an internally-fitting lid. The assembly was left undisturbed, with the lid fixed in place, for 30 minutes at room temperature. After removal from the mould the moulded block of composite cellular material obtained was allowed to stand in the atmosphere for 30 minutes so that its slight tackiness could disappear. It had a density of 4.1 lb./cu. ft.

A "control" material was made to the same density using no expanded polystyrene granules, and the load/compression characteristics of the two materials were investigated. The polystyrene-containing material was found to support a greater load at all observed values of compression, and to show a greater relative improvement in load-carrying capacity as the compression increased; thus at a compression of 60% of original thickness, it was more than twice as hard as the "control," i.e. was carrying over twice the load, and at 80% of original thickness it was still 1.57 times as hard as the "control."

*Example 8*

The procedure followed was the same as that of Example 7 except in that the proportion of granules to crumb was increased from 1 to 19 to 1 to 9.

The material obtained again had a density of 4.1 lb./cu. ft., and again supported a greater load at all observed values of compression than the "control," and showed a greater relative improvement in load-carrying capacity as the compression increased; thus at a compression of 80% of original thickness its load-carrying capacity was 3.3 times that of the "control."

*Example 9*

The procedure followed was generally similar to that of Example 7, but in this case the crumb and granules were supplemented by reclaimed rayon fibre derived from tyre reclaiming and having particles of vulcanised rubber composition associated with it. The proportions of bonded material used were 1 part of granules to 17 of crumb and 2 of fibre. The granules and fibre were first mixed with each other for 15 minutes, next the crumb was added and the mixture stirred for 5 minutes, and then the liquid bonding agent (as in Examples 7 and 8) was added and stirring continued for 10 minutes; the proportion of bonding agent to bonded material was as before 1 part to 5 parts respectively.

A moulded block prepared as in Examples 7 and 8 had a density of 4.1 lbs./cu. ft. Its load-compression characteristics were investigated, as also were those of a "control" material, of the same density. The latter was made from crumb and fibre in the proportions 9 parts to 1 part respectively, with no expanded polystyrene, by mixing for 15 minutes, adding 1 part of liquid bonding agent to every 7 parts of crumb and fibre, mixing again for 15 minutes, and moulding as before. At a compression of 60% of original thickness, the load-carrying capacity of the polystyrene-containing material of this example was 1.39 times that of the "control" material of this example and 1.56 times that of the "control" material of Example 7.

Having now described our invention, what we claim is:

1. Resilient cellular material comprising a cellular mass of resilient organic polymer of the class consisting of natural rubber, synthetic rubber and resilient polyurethane and particles of rigid expanded material dispersed in said mass of resilient organic polymer and of dimensions in the range from 0.002 to 0.100 mm., in total amount from ¼% to 30% of the weight of the resilient organic polymer and with a bulk volume from 0.01% to 25% of the bulk volume of the resilient organic material said particles being hollow unicellular substantially spherical bodies.

2. The resilient cellular material of claim 1 in which said particles of rigid expanded material are of urea-formaldehyde resin.

3. The resilient cellular material of claim 1 in which said particles of rigid expanded material are of nitrogen-filled phenol formaldehyde resin.

4. A method of making a resilient cellular material which comprises dispersing rigid hollow unicellular substantially spherical bodies of a diameter in the range from 0.002 mm. to 0.100 mm. in a fluid, curable, organic polymer of the class consisting of dispersions of natural rubber and of synthetic rubber and polyurethane and in an amount from ¼% to 30% by weight of the organic polymer, foaming said organic polymer to a cellular structure and curing said foamed polymer to a resilient solid.

5. The method of claim 4 in which said fluid curable organic polymer is a compounded aqueous dispersion of unvulcanized natural and synthetic rubber and vulcanizing and compounding ingredients.

6. The method of claim 4 in which said fluid curable organic polymer is a liquid polyurethane prepolymer comprising an intermediate reaction product of an organic polyisocyanate and an organic chain compound having reactive isocyanate radicals.

References Cited by the Examiner

UNITED STATES PATENTS

| | | | |
|---|---|---|---|
| 2,539,931 | 1/1951 | Rogers et al. | 260—2.5 |
| 2,797,201 | 6/1957 | Veatch et al. | 260—2.5 |
| 2,806,509 | 9/1957 | Bozzacco et al. | 260—2.5 |
| 2,832,997 | 5/1958 | Bristol | 260—2.5 |
| 2,894,919 | 7/1959 | Simon et al. | 260—2.5 |
| 3,114,722 | 12/1963 | Einhorn et al. | 260—2.5 |

OTHER REFERENCES

German Patentanmeldung, Stastny, B 29,206, Mar. 8, 1956, 3 pages spec., no drawing.

LEON J. BERCOVITZ, *Primary Examiner.*

D. E. CZAJA, *Assistant Examiner.*